United States Patent [19]

Makilaakso

[11] Patent Number: 4,509,660

[45] Date of Patent: Apr. 9, 1985

[54] TUBE END PIECE

[75] Inventor: Antero Makilaakso, Espoo, Finland

[73] Assignee: Printal Oy, Helsinki, Finland

[21] Appl. No.: 475,320

[22] Filed: Mar. 14, 1983

[30] Foreign Application Priority Data

Mar. 17, 1982 [FI] Finland ................................. 820914

[51] Int. Cl.³ .............................................. B65D 35/10
[52] U.S. Cl. ...................................... 222/107; 220/67;
220/1 S; 229/5.5; 428/57
[58] Field of Search ............................... 220/77, 67, 1;
150/52 R; 156/66; 24/201; 222/92, 107;
428/52, 36, 57; 229/5.5

[56] References Cited

U.S. PATENT DOCUMENTS

| | | | |
|---|---|---|---|
| 3,044,658 | 7/1962 | Combs et al. ................. | 220/81 R X |
| 3,465,917 | 9/1969 | Saeki ................................ | 222/107 |
| 3,578,524 | 5/1971 | Ignell ............................. | 224/430 X |
| 3,654,049 | 4/1972 | Ausnit .............................. | 150/52 R |
| 3,679,531 | 7/1972 | Wienand et al. ................. | 24/201 X |
| 3,700,513 | 10/1972 | Haberhauer et al. ........... | 222/107 X |
| 3,817,427 | 6/1974 | Neff et al. ......................... | 220/77 X |

*Primary Examiner*—Henry F. Epstein
*Attorney, Agent, or Firm*—Martin Smolowitz

[57] ABSTRACT

A tube end piece for a separately manufactured tube mantle and method for assembly. The solutions presented in prior art for providing tube mantles with an end piece are generally satisfactory, except that the number of manufacturing steps is large compared with conventional manufacturing methods. With the aid of this invention, one step at least can be eliminated in the joining of the end piece and the mantle. The end piece is provided with an annular extension which can be pressed down so that it remains in its place, clamping the interposed mantle fast to the end piece. Thus by using the tube end piece it becomes possible to perform the joint seaming of the end piece to the tube mantle in one work step.

5 Claims, 4 Drawing Figures

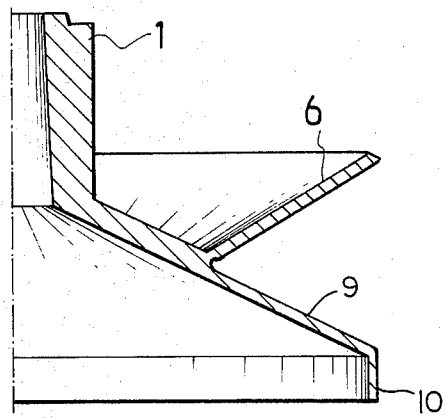
Fig.1
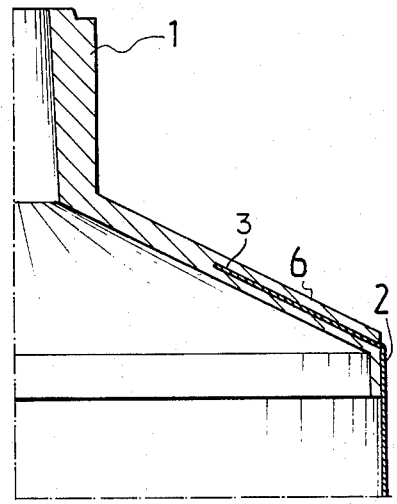
Fig.2
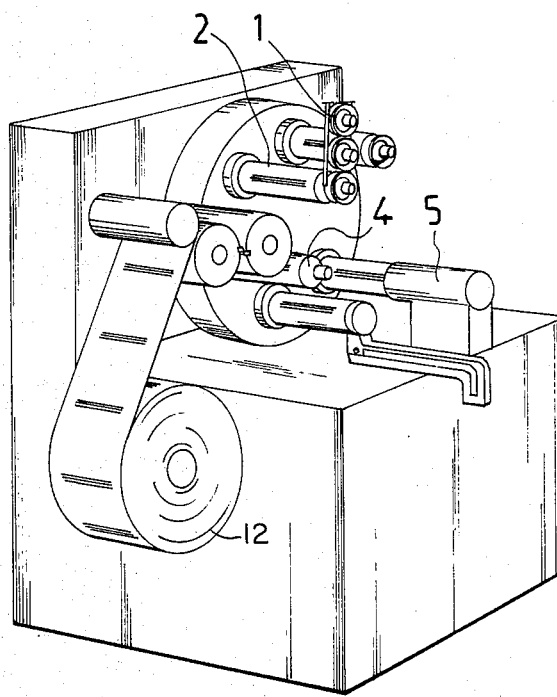
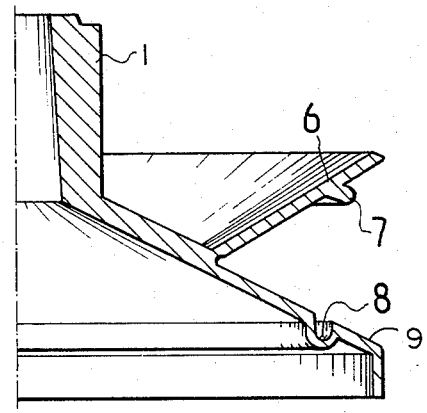
Fig. 3
Fig. 4

TUBE END PIECE

BACKGROUND OF INVENTION

The present invention concerns an end piece for a tube mantle which is separately manufactured.

Packaging tubes are made mainly by two different methods: by extruding from one single piece of material, or by combining a tube that has been rolled of thin sheet, for instance of foil, and thereafter seamed, to an end piece. Joining of the mantle made of foil to said end piece is accomplished by the aid of a cuff or equivalent clamping member which is pressed upon the end piece to impact the margin of the mantle therebetween, whereby a tight and leak-free joint is obtained. The assembly comprises many work steps compared e.g. with the manufacturing of a deep-drawn tube, owing to the number of components. A manufacturing procedure of this type has for instance been disclosed in the Finnish patent application No. 814142.

In the U.S. Pat. No. 3,817,427 is encountered a tube end piece where at the juncture of a conical part and a cylindrical part has been shaped a projection which is supposed to be conducive to faster assembly similarly as the invention now to be presented. The bending downward of this projection to the purpose of affixing the mantle is based on plastic deformation of the material. In the case of metals, a deformation of this magnitude is doubtful, particularly in view of achieving tight sealing; in the case of plastic materials, again, softening of extensive areas by heating is required for this operation to be successful—as is indeed mentioned in the reference. The heating of plastics is slow and energy-consuming, and in the final product a nodule is formed at the seam; this nodule impedes the rolling of the tubes along a straight line e.g. on automatic tracks.

DESCRIPTION OF INVENTION

The object of the present invention is to provide a tube end piece which reduces the number of work steps necessary for joining it to a tube mantle and to avoid the drawbacks mentioned above. The tube end piece of the invention is characterized in that on the end piece has been provided in readiness a mantle fixing and seaming member consisting of an annular projection which is bendable and stable in two different positions.

The invention is also characterized in that the annular projection presents an outwardly directed clamping tongue and in the mating piece a correspondingly shaped annular groove for clamping the mantle.

The invention is described with the aid of an example with reference to the attached drawings, wherein FIG. 1 presents a sectioned view of the tube end, prior to assembly showing the annular projection in its upper position.

FIG. 2 presents a sectioned view of the tube end and mantle after assembly.

FIG. 3 shows a sectioned view of the tube end, the annular projection being furnished with clamping means.

FIG. 4 illustrates the assembly procedure for the tube end piece and mantle.

As shown in FIG. 1, end piece 1 is provided with an annular projection 6 extending radially outwardly from a conical-shaped lower portion 9 of the end piece and has a connecting portion 10. When joining the end piece 1 to an end of a tube mantle 2, the end piece portion 10 is first inserted partly into the mantle 2, after which end portion 3 of mantle 2 is folded downwardly against the conical portion 9 of the end piece 1, as is shown in FIG. 2. Next, the annular projection 6 is folded or snapped downwardly into its lower stable clamping position onto end portion 3 of the mantle 2, where it remains and is heat-seamed together to form a tight joint therebetween, as shown in FIG. 2.

An alternative embodiment of the invention is shown in FIG. 3, in which the annular projection 6 of end piece 1 is provided with an outwardly directed clamping tongue 7 which fits into a correspondingly shaped annular groove 8 located in conical portion 9. These mating tongue and groove parts provide additional clamping means for end portions 3 of tube mantle 2 to provide a tight seal for end portion 3 between the annular projection 6 and conical lower portion 9 of end piece 1.

The method for assembling the end pieces 1 to tubular mantles 2 is further illustrated by FIG. 4. An automatic assembly station is concerned here, in which the ready-processed and printed tube mantles make a circuit in a turret-resembling assembly machine (see FIG. 4).

The cut-off strip coupon from roll 12 is wound around a mandrel 4 to become a mantle 2, moving thereafter one step further to the position where the end piece 1 (see FIG. 1) is put on the end of the mantle 2. The tube mantle moves one step further to a station where the end of the mantle is pushed past the connecting portion 10 of end piece conical portion 9 and is bent flush with the end piece. The tube moves forward one step again to a station in which the annular projection 6 is bent or snapped downward and clamped onto folded mantle end 3 and the components are pressed and hot-seamed together with an apparatus 5 provided to this purpose, the result being as shown in FIG. 2. The next step is removal of the tube from the machine, and the tube is finally filled through the rear and folded closed.

It is obvious to a person skilled in the art that different embodiments of the invention may vary within the scope of the claims stated below. It is possible instead of heat seaming to apply e.g. ultrasonic welding or cementing, and it is possible with a view to promoting the tightness to shape or roughen the clamping surfaces in various ways.

I claim:

1. A tube end piece adapted for convenient joining to a separately manufactured tube mantle, wherein on a conical portion of said end piece a bendable fixing and seaming member is provided flexibly attached thereto in readiness for bending down onto and clamping an end of the tube mantle, said fixing member consisting of an annular bendable extension extending outwardly from said conical portion and which is stable in both an initial upper position and also in a downward clamped position against said end of the tube mantle.

2. A tube end piece according to claim 1, wherein said annular extension carries an outwardly directed clamping tongue and a mating member on said conical portion which has a correspondingly shaped annular groove for clamping the tube mantle therebetween.

3. A tube end piece according to claim 1, wherein the mating surfaces of said conical portion and annular extension contacting the tube mantle are roughened to promote tightness of the joint between the end piece and the tube mantle.

4. A tube end piece adapted for convenient joining to a separately manufactured tube mantle, wherein a bendable, fixing and seaming member is provided on a conical portion of said end piece, said seaming member consisting of an annular extension extending outwardly from said conical portion and which carries an outwardly directed clamping tongue and a mating member on said conical portion having a correspondingly shaped annular groove for bending down onto and clamping a folded-over end portion of the tube mantle to the end piece, so as to provide a tight seal therebetween.

5. A tube end piece adapted for convenient joining to a separately manufactured tube mantle, wherein a bendable fixing and seaming member is provided flexibly attached to an outer conical portion of the end piece, said fixing member consisting of an annular extension which extends outwardly from said conical portion and is stable in an upper and in a lower clamping position, said conical portion having a roughened upper surface, whereby said annular extension can be bend downward to its lower stable position to clamp a folded-over end portion of the tube mantle to the conical portion to provide a tight clamped joint therebetween.

* * * * *